(12) United States Patent
Ibrahim

(10) Patent No.: US 12,283,001 B2
(45) Date of Patent: Apr. 22, 2025

(54) COMPUTATION OF THREE-DIMENSIONAL EULER ANGLES THROUGH A DISTINCTIVE MATRICES PATTERN

(71) Applicant: QATAR UNIVERSITY, Doha (QA)

(72) Inventor: Rony Ibrahim, Doha (QA)

(73) Assignee: QATAR UNIVERSITY, Doha (QA)

( * ) Notice: Subject to any disclaimer, the term of this patent is extended or adjusted under 35 U.S.C. 154(b) by 144 days.

(21) Appl. No.: 17/972,330

(22) Filed: Oct. 24, 2022

(65) Prior Publication Data

US 2023/0130100 A1 Apr. 27, 2023

Related U.S. Application Data

(60) Provisional application No. 63/271,359, filed on Oct. 25, 2021.

(51) Int. Cl.
*G06T 19/00* (2011.01)

(52) U.S. Cl.
CPC .................. *G06T 19/00* (2013.01)

(58) Field of Classification Search
CPC .......... G06F 17/10; G06F 17/11; G06F 17/12; G06T 19/00; G06T 19/003
See application file for complete search history.

(56) References Cited

U.S. PATENT DOCUMENTS

| 8,340,400 B2 | 12/2012 | Lukas et al. |
| 10,213,645 B1 | 2/2019 | Wu et al. |
| 10,229,508 B2 | 3/2019 | Alibay et al. |
| 10,334,168 B2 | 6/2019 | Alibay et al. |
| 11,255,664 B2 | 2/2022 | Cutri et al. |
| 2015/0363967 A1* | 12/2015 | Wells ...................... G06T 19/00 345/419 |
| 2019/0004619 A1* | 1/2019 | Kahle ...................... G01S 17/66 |

(Continued)

FOREIGN PATENT DOCUMENTS

| CN | 107037880 A | 8/2017 |
| CN | 112183482 A | 1/2021 |

OTHER PUBLICATIONS

Tanya Olsen et al., Micropspacecraft and Earth Observation: Electrical Field (ELF) Measurement Project, No. NASA-CR-186821, 1990, 190 pages, downloaded from: https://ntrs.nasa.gov/api/citations/19900017120/downloads/19900017120.pdf. (Year: 1990).*

*Primary Examiner* — Jeffery A Brier
(74) *Attorney, Agent, or Firm* — ISQUIRE PATTON BOGGS (US) LLP

(57) ABSTRACT

Systems, methods, apparatuses, and computer program products for computing three-dimensional (3D) Euler angles through a distinctive matrices pattern. A method for calculating relative orientations of rigid bodies in space may include determining a three-dimensional (3D) coordinate system of a rigid body D at a time T. The method may also include determining a 3D coordinate system of a rigid body E at time T. The method may further include determining a relative orientation at time T of the rigid body E in the 3D coordinate system of the rigid body D. In addition, the method may include calculating a final relative orientation of the rigid body E in the 3D coordinate system of the rigid body D by implementing a single set of Euler angle equations irrespective of a rotation sequence or a convention chosen.

12 Claims, 8 Drawing Sheets

(56) References Cited

U.S. PATENT DOCUMENTS

| | | |
|---|---|---|
| 2020/0232737 A1 | 7/2020 | McClellan et al. |
| 2021/0362839 A1 | 11/2021 | Nakazawa et al. |
| 2022/0114803 A1 | 4/2022 | Wang et al. |
| 2022/0122334 A1 | 4/2022 | Wang et al. |

* cited by examiner

```
function [α,β,γ] = euler('ijk',R)
% 'ijk' is a string in the form of XYZ, or YZX, etc.
% R is the rotation matrix on which to calculate the euler angles α,β, and γ

1   seq = Convert 'ijk' from string to double, then subtract the array from the double of 'W'
2   β = inverse sine (Levi-civita of 'kji' * R(seq(1),seq(3)))
3   α = four-quadrant inverse tangent (Levi-civita of 'kji' * R(seq(2),seq(3)), R(seq(3),seq(3)))
4   γ = four-quadrant inverse tangent (Levi-civita of 'jik' * R(seq(1),seq(2)), R(seq(1),seq(1)))
```

FIG. 1

```
function [α,β,γ] = euler(seq,R)
% seq is an array in the form of [1,2,3] for XYZ, or [2,3,1] for YZX, etc. So 1 is for X, 2
is for Y and 3 for Z
% R is the rotation matrix on which to calculate the euler angles α,β, and γ

1   β = inverse sine (Levi-civita of [seq(3),seq(1),seq(2)] * R(seq(1),seq(3)))
2   α = four-quadrant inverse tangent (Levi-civita of [seq(3),seq(2),seq(1)] * R(seq(2),seq(3)),
    R(seq(3),seq(3)))
3   γ = four-quadrant inverse tangent (Levi-civita of [seq(2),seq(1),seq(3)] * R(seq(1),seq(2)),
    R(seq(1),seq(1)))
```

FIG. 2

```
function [α,,γ] = euler('ijk',R)
% 'ijk' is a string in the form of XYZ, or YZX, etc.
% R is the rotation matrix on which to calculate the euler angles α,β, and γ

1  seq = Convert 'ijk' from string to double, then subtract the array from the double of 'W'
2  β = four-quadrant inverse tangent (Levi-civita of 'kji' * R(seq(1),seq(3)) * R(seq(2),seq(3)), square root of (1 – R(seq(1),seq(3))^2)
3  α = four-quadrant inverse tangent (Levi-civita of 'kji' * R(seq(2),seq(3)), R(seq(3),seq(3)))
4  γ = four-quadrant inverse tangent (Levi-civita of 'jik' * R(seq(1),seq(2)), R(seq(1),seq(1)))
```

FIG. 3

```
function [α,β,γ] = euler(seq,R)
% seq is an array in the form of [1,2,3] for XYZ, or [2,3,1] for YZX, etc. So 1 is for X, 2 is for Y and 3 for Z
% R is the rotation matrix on which to calculate the euler angles α,β, and γ

1  β = four-quadrant inverse tangent (Levi-civita of [seq(3),seq(1),seq(2)] * R(seq(1),seq(3)), square root of (1 – R(seq(1),seq(3))^2)
2  α = four-quadrant inverse tangent (Levi-civita of [seq(3),seq(2),seq(1)] * R(seq(2),seq(3)), R(seq(3),seq(3))),
3  γ = four-quadrant inverse tangent (Levi-civita of [seq(2),seq(1),seq(3)] * R(seq(1),seq(2)), R(seq(1),seq(1)))
```

FIG. 4 function [α,β,γ] = euler('ijk',A,B)
% 'ijk' is a string in the form of XYZ, or YZX, etc.
% A and B are the rotation matrices on which to calculate the euler angles α, β, and γ.
These angles are calculated as the angles of B relative to A 1  seq = Convert 'ijk' from string to double, then subtract the array from the double of 'w'
2  R = transpose of A post-multiplied by B
3  β = inverse sine (Levi-civita of 'kij' * R(seq(1),seq(3)))
4  α = four-quadrant inverse tangent (Levi-civita of 'kji' * R(seq(2),seq(3)), R(seq(3),seq(3)))
5  γ = four-quadrant inverse tangent (Levi-civita of 'jik' * R(seq(1),seq(2)), R(seq(1),seq(1)))

FIG. 5 function [α,β,γ] = euler(seq,A,B)
% seq is an array in the form of [1,2,3] for XYZ, or [2,3,1] for YZX, etc. So 1 is for X, 2 is for Y and 3 for Z
% A and B are the rotation matrices on which to calculate the euler angles α, β, and γ.
These angles are calculated as the angles of B relative to A 1  R = transpose of A post-multiplied by B
2  β = inverse sine (Levi-civita of [seq(3),seq(1),seq(2)] * R(seq(1),seq(3)))
3  α = four-quadrant inverse tangent (Levi-civita of [seq(3),seq(2),seq(1)] * R(seq(2),seq(3)), R(seq(3),seq(3)))
4  γ = four-quadrant inverse tangent (Levi-civita of [seq(2),seq(1),seq(3)] * R(seq(1),seq(2)), R(seq(1),seq(1)))

FIG. 6 function [α,β,γ] = euler('ijk',A,B)
% 'ijk' is a string in the form of XYZ, or YZX, etc.
% A and B are the rotation matrices on which to calculate the euler angles α,β, and γ.
These angles are calculated as the angles of B relative to A 1  seq = Convert 'ijk' from string to double, then subtract the array from the double of 'w'
2  R = transpose of A post-multiplied by B
3  β = four-quadrant inverse tangent (Levi-civita of 'kij' * R(seq(1),seq(3)), square root of (1 – R(seq(1),seq(3))^2)
4  α = four-quadrant inverse tangent (Levi-civita of 'kji' * R(seq(2),seq(3)), R(seq(3),seq(3)))
5  γ = four-quadrant inverse tangent (Levi-civita of 'ijk' * R(seq(1),seq(2)), R(seq(1),seq(1)))

FIG. 7 function [α,β,γ] = euler(seq,A,B)
% seq is an array in the form of [1,2,3] for XYZ, or [2,3,1] for YZX, etc. So 1 is for X, 2 is for Y and 3 for Z
% A and B are the rotation matrices on which to calculate the euler angles α,β, and γ.
These angles are calculated as the angles of B relative to A 1  R = transpose of A post-multiplied by B
2  β = four-quadrant inverse tangent (Levi-civita of [seq(3),seq(1),seq(2)] * R(seq(1),seq(3)), square root of (1 – R(seq(1),seq(3))^2)
3  α = four-quadrant inverse tangent (Levi-civita of [seq(3),seq(2),seq(1)] * R(seq(2),seq(3)), R(seq(3),seq(3)))
4  γ = four-quadrant inverse tangent (Levi-civita of [seq(2),seq(1),seq(3)] * R(seq(1),seq(2)), R(seq(1),seq(1)))

FIG. 8 function [α,.,γ] = euler('ijk',A,B)
% 'ijk' is a string in the form of XYZ, or YZX, etc.
% A and B are the rotation matrices on which to calculate the euler angles α, β, and γ.
These angles are calculated as the angles of B relative to A 1  seq = Convert 'ijk' from string to double, then subtract the array from the double of 'W'
2  β = inverse sine (Levi-civita of 'kji' * $\sum_{m=1}^{3} A(seq(1),m) * B(m,seq(3))$)
3  α = four-quadrant inverse tangent (Levi-civita of 'kji' * $\sum_{m=1}^{3} A(seq(2),m) * B(m,seq(3))$, $\sum_{m=1}^{3} A(seq(3),m) * B(m,seq(3))$)
4  γ = four-quadrant inverse tangent (Levi-civita of 'jik' * $\sum_{m=1}^{3} A(seq(1),m) * B(m,seq(2))$, $\sum_{m=1}^{3} A(seq(1),m) * B(m,seq(1))$)

FIG. 9 function [α,β,γ] = euler(seq,A,B)
% seq is an array in the form of [1,2,3] for XYZ, or [2,3,1] for YZX, etc. So 1 is for X, 2 is for Y and 3 for Z
% A and B are the rotation matrices on which to calculate the euler angles α, β, and γ.
These angles are calculated as the angles of B relative to A 1  β = inverse sine (Levi-civita of [seq(3),seq(1),seq(2)] * $\sum_{m=1}^{3} A(seq(1),m) * B(m,seq(3))$)
2  α = four-quadrant inverse tangent (Levi-civita of [seq(3),seq(2),seq(1)] * $\sum_{m=1}^{3} A(seq(2),m) * B(m,seq(3))$, $\sum_{m=1}^{3} A(seq(3),m) * B(m,seq(3))$)
3  γ = four-quadrant inverse tangent (Levi-civita of [seq(2),seq(1),seq(3)] * $\sum_{m=1}^{3} A(seq(1),m) * B(m,seq(2))$, $\sum_{m=1}^{3} A(seq(1),m) * B(m,seq(1))$)

FIG. 10 function $[\alpha,\beta,\gamma]$ = euler('ijk',A,B)
% 'ijk' is a string in the form of XYZ, or YZX, etc.
% A and B are the rotation matrices on which to calculate the euler angles $\alpha, \beta,$ and $\gamma$.
These angles are calculated as the angles of B relative to A 1. seq = Convert 'ijk' from string to double, then subtract the array from the double of 'W'
2. $\beta$ = four-quadrant inverse tangent (Levi-civita of 'kij' * $\sum_{m=1}^{3} A(seq(1),m) * B(m,seq(3))$, square root of $(1 - (\sum_{m=1}^{3} A(seq(1),m) * B(m,seq(3)))^{\wedge}2))$
3. $\alpha$ = four-quadrant inverse tangent (Levi-civita of 'kji' * $\sum_{m=1}^{3} A(seq(2),m) * B(m,seq(3))$, $\sum_{m=1}^{3} A(seq(3),m) * B(m,seq(3)))$
4. $\gamma$ = four-quadrant inverse tangent (Levi-civita of 'jik' * $\sum_{m=1}^{3} A(seq(1),m) * B(m,seq(2))$, $\sum_{m=1}^{3} A(seq(1),m) * B(m,seq(1)))$

FIG. 11 function $[\alpha,\beta,\gamma]$ = euler(seq,A,B)
% seq is an array in the form of [1,2,3] for XYZ, or [2,3,1] for YZX, etc. So 1 is for X, 2 is for Y and 3 for Z
% A and B are the rotation matrices on which to calculate the euler angles $\alpha, \beta,$ and $\gamma$.
These angles are calculated as the angles of B relative to A 1. $\beta$ = four-quadrant inverse tangent (Levi-civita of [seq(3),seq(1),seq(2)] * $\sum_{m=1}^{3} A(seq(1),m) * B(m,seq(3))$, square root of $(1 - (\sum_{m=1}^{3} A(seq(1),m) * B(m,seq(3)))^{\wedge}2))$
2. $\alpha$ = four-quadrant inverse tangent (Levi-civita of [seq(3),seq(2),seq(1)] * $\sum_{m=1}^{3} A(seq(2),m) * B(m,seq(3))$, $\sum_{m=1}^{3} A(seq(3),m) * B(m,seq(3)))$
3. $\gamma$ = four-quadrant inverse tangent (Levi-civita of [seq(2),seq(1),seq(3)] * $\sum_{m=1}^{3} A(seq(1),m) * B(m,seq(2))$, $\sum_{m=1}^{3} A(seq(1),m) * B(m,seq(1)))$

FIG. 12

COMPUTATION OF THREE-DIMENSIONAL EULER ANGLES THROUGH A DISTINCTIVE MATRICES PATTERN

CROSS-REFERENCE TO RELATED APPLICATION

This application claims priority from U.S. provisional patent application No. 63/271,359 filed on Oct. 25, 2021. The contents of this earlier filed application are hereby incorporated by reference in their entirety.

FIELD

Some embodiments may generally relate to three-dimensional (3D) Euler angles. More specifically, certain embodiments may relate to apparatuses, systems, and/or methods for computing 3D Euler angles through a distinctive matrices pattern.

BACKGROUND

3D Euler angles are usually computed using manual identification of a single element in a rotation matrix, and then solved based on trigonometric functions. The computation of Euler angles may depend on an axis rotation sequence. Every axis rotation sequence may lead to a well-distinguished and consistent 3×3 matrix elements. For instance, the axis rotation sequence of XYZ may lead to a 3×3 matrix where the matrix element (M13) is the singular one. In another example, the axis rotation sequence XZY may lead to a 3×3 matrix where the matrix element (M12) is the singular one.

Euler angles may conventionally be calculated with manual identification of the single element in a matrix. A rotation matrix R corresponding to an XYZ convention as a function of Euler angles ($\alpha$, $\beta$, and $\gamma$) may be represented as the following expression (1):

$$\begin{bmatrix} \cos\beta\cos\gamma & -\cos\beta\sin\gamma & \sin\beta \\ \sin\alpha\sin\beta\cos\gamma + \cos\alpha\sin\gamma & -\sin\alpha\sin\beta\sin\gamma + \cos\alpha\cos\gamma & -\sin\alpha\cos\beta \\ -\cos\alpha\sin\beta\cos\gamma + \sin\alpha\sin\gamma & \cos\alpha\sin\beta\sin\gamma + \sin\alpha\cos\gamma & \cos\alpha\cos\beta \end{bmatrix} \quad (1)$$

With expression (1), the three Euler angles may be computed using the following equations (2), (3), and (4) that correspond to the XYZ convention:

$$\tan\alpha = \frac{-R_{23}}{R_{33}} \quad (2)$$

$$\sin\beta = R_{13} \quad (3)$$

$$\tan\gamma = \frac{-R_{12}}{R_{11}} \quad (4)$$

As shown in equations (2), (3), and (4), the subscript numbers may correspond to the row number and the column number in the rotation matrix R, respectively. Additionally, $R_{13}$ may correspond to the element of R at the first row and third column. According to certain example embodiments, if the convention is changed to YXZ, instead of XYZ, then the rotation matrix R may be changed to the following expression (5):

$$\begin{bmatrix} \sin\alpha\sin\beta\sin\gamma + \cos\alpha\cos\gamma & \sin\alpha\sin\beta\cos\gamma - \cos\alpha\sin\gamma & \sin\alpha\cos\beta \\ \cos\beta\sin\gamma & \cos\beta\cos\gamma & -\sin\beta \\ \cos\alpha\sin\beta\sin\gamma - \sin\alpha\cos\gamma & \cos\alpha\sin\beta\cos\gamma + \sin\alpha\sin\gamma & \cos\alpha\cos\beta \end{bmatrix} \quad (5)$$

Every time the rotation sequence or the rotation convention is changed, there may be a new set of three equations to solve for the Euler angles. In the above expression (5), the second convention 'YXZ' may change the elements of R and their locations. As a result, a new set of three equations to solve for Euler angles may be formed as equations (6), (7), and (8):

$$\tan\alpha = \frac{R_{13}}{R_{33}} \quad (6)$$

$$\sin\beta = -R_{23} \quad (7)$$

$$\tan\gamma = \frac{R_{21}}{R_{22}} \quad (8)$$

Thus far, there has not been any development with regard to the pattern between the rotation sequence and the position of elements in the rotation matrix. As such, there is a need to provide an algorithm that makes use of this unique pattern to compute Euler angles in any sequence at once.

SUMMARY

Certain embodiments may be directed to a method for calculating relative orientations of rigid bodies in space. The method may include determining a three-dimensional (3D) coordinate system of a rigid body D at a time T. The method may also include determining a 3D coordinate system of a rigid body E at time T. The method may further include determining a relative orientation at time T of the rigid body E in the 3D coordinate system of the rigid body D. In addition, the method may include calculating a final relative orientation of the rigid body E in the 3D coordinate system of the rigid body D by implementing a single set of Euler angle equations irrespective of a rotation sequence or a convention chosen. According to certain example embodiments, the determination of the 3D coordinate systems of the rigid body D and the rigid body E may be represented each in the form of 3×3 rotation matrices.

Other embodiments may be directed to an apparatus for calculating relative orientations of rigid bodies in space. The apparatus may include at least one processor, and at least one memory including computer program code. The at least one memory and the computer program code may be configured to, with the at least one processor, cause the controller at least to determine a three-dimensional (3D) coordinate system of a rigid body D at a time T. The apparatus may also be caused to determine a 3D coordinate system of a rigid body E at time T. The apparatus may further be caused to determine a relative orientation at time T of the rigid body E in the 3D coordinate system of the rigid body D. In addition, the apparatus may be caused to calculate a final relative orientation of the rigid body E in the 3D coordinate system of the rigid body D by implementing a single set of Euler angle equations irrespective of a rotation sequence or a convention chosen. According to certain example embodiments, the determination of the 3D coordinate systems of the rigid body D and the rigid body E may be represented each in the form of 3×3 rotation matrices.

Other embodiments may be directed to a computer program, embodied on a non-transitory computer readable medium. The computer program, when executed by a processor, may cause the processor to determine a three-dimensional (3D) coordinate system of a rigid body D at a time T. The processor may also be caused to determine a 3D coordinate system of a rigid body E at time T. The processor may further be caused to determine a relative orientation at time T of the rigid body E in the 3D coordinate system of the rigid body D. In addition, the processor may be caused to calculate a final relative orientation of the rigid body E in the 3D coordinate system of the rigid body D by implementing a single set of Euler angle equations irrespective of a rotation sequence or a convention chosen. According to certain example embodiments, the determination of the 3D coordinate systems of the rigid body D and the rigid body E may be represented each in the form of 3×3 rotation matrices.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 1 illustrates an example pseudo-code, according to certain example embodiments.

FIG. 2 illustrates another example pseudo-code, according to certain example embodiments.

FIG. 3 illustrates another example pseudo-code, according to certain example embodiments.

FIG. 4 illustrates another example pseudo-code, according to certain example embodiments.

FIG. 5 illustrates another example pseudo-code, according to certain example embodiments.

FIG. 6 illustrates another example pseudo-code, according to certain example embodiments.

FIG. 7 illustrates another example pseudo-code, according to certain example embodiments.

FIG. 8 illustrates another example pseudo-code, according to certain example embodiments.

FIG. 9 illustrates another example pseudo-code, according to certain example embodiments.

FIG. 10 illustrates another example pseudo-code, according to certain example embodiments.

FIG. 11 illustrates another example pseudo-code, according to certain example embodiments.

FIG. 12 illustrates another example pseudo-code, according to certain example embodiments.

DETAILED DESCRIPTION

Figure 13:
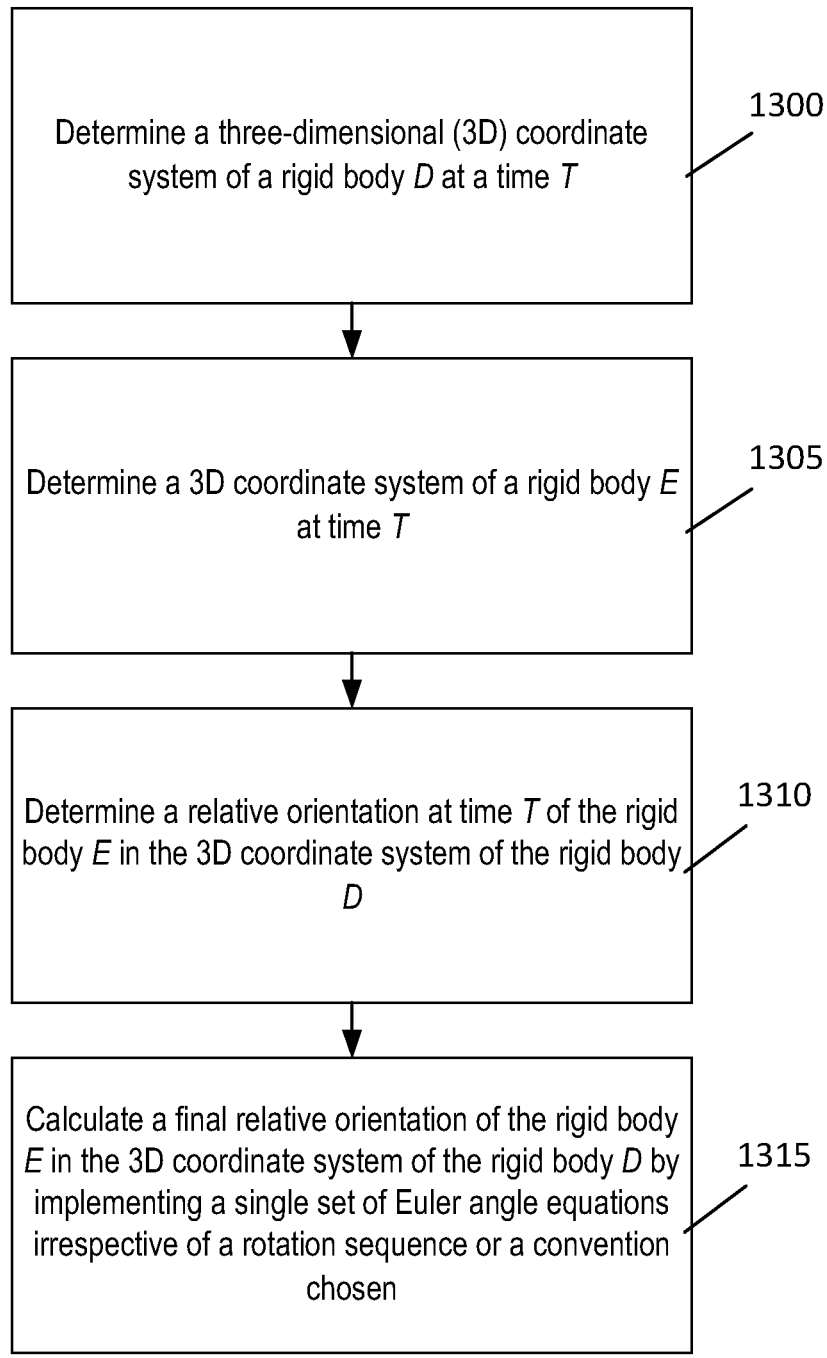
FIG. 13 illustrates a flow diagram of a method, according to certain embodiments.

It will be readily understood that the components of certain example embodiments, as generally described and illustrated in the figures herein, may be arranged and designed in a wide variety of different configurations. The following is a detailed description of some embodiments for assisting people with visual impairments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain example embodiments," "an example embodiment," "in some example embodiments," "in other example embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

3D Euler angles may be computed based on sequences of rotation around the axes (i.e., X, Y, Z). The specific sequence may be selected based on the largest expected rotation, potential gimbal lock, and singularity. Prior algorithms have failed to compute 3D Euler angles in all sequences about the main axes at once. Thus, certain example embodiments may provide a unique pattern between the sequence of rotations and the positions of the elements in the 3D rotational matrices.

Certain example embodiments may be developed in any conventional programming language such as, for example, MATLAB, and may be able to make use of a unique pattern to compute Euler angles in any sequence at once. As noted above, Euler angles cannot be solved unless the matrix element with a single trigonometric function is identified. This identification technique may be performed manually, for the lack of a clear generalized relationship between any axis rotation sequence and the resulting matrix elements' location.

According to certain example embodiments, the relationship between any axis rotation sequence and the resulting matrix elements' location may be identified using unique algorithm that may implement this relationship to automatically compute the Euler angles of any single axis rotation sequence instantly. For instance, in some example embodiments, the algorithm may be developed in any conventional programming language such as, for example, MATLAB.

In certain example embodiments, verification of certain algorithms may be performed by checking if the new algorithm may automatically identify the matrix elements from the inputted axis rotation sequence. In some example embodiments, verification was successful for all single axis rotation sequences, matching the exact Euler angles computed by manual identification.

According to certain example embodiments, exemplary equations (9) to (11) for determining the 3D orientation of a rigid body in space may be as follows:

$$\tan\alpha = \varepsilon_{kji} \cdot \frac{\sum_{m=1}^{n} A'_{jm} \cdot B_{mk}}{\sum_{m=1}^{n} A'_{km} \cdot B_{mk}} = \varepsilon_{kji} \cdot \frac{R_{jk}}{R_{kk}} \quad (9)$$

$$\tan\beta = \varepsilon_{kij} \cdot \frac{\sum_{m=1}^{n} A'_{im} \cdot B_{mk}}{\sqrt{1 - \left(\sum_{m=1}^{n} A'_{im} \cdot B_{mk}\right)^2}} = \varepsilon_{kij} \cdot \frac{R_{ik}}{\sqrt{1 - R_{ik}^2}} \quad (10a)$$

-continued $$\sin\beta = \varepsilon_{kij} \cdot \sum_{m=1}^{n} A'_{im} \cdot B_{mk} = \varepsilon_{kij} \cdot R_{ik} \quad (10b)$$

$$\tan\gamma = \varepsilon_{jik} \cdot \frac{\sum_{m=1}^{n} A'_{im} \cdot B_{mj}}{\sum_{m=1}^{n} A'_{im} \cdot B_{mi}} = \varepsilon_{jik} \cdot \frac{R_{ij}}{R_{ii}} \quad (11)$$

In certain example embodiments, space may correspond to a virtual space or a physical space existing in the real world. In equations (9) to (11) above, i, j, k represent the first, second and third axis, respectively, in the three-dimensional axis rotation sequences. For instance, if the first rotation is around the y-axis then i=y=2, if the second rotation is around the x-axis then j=x=1, and the third rotation is around the z-axis, then k=z=3. In this example, ijk is equal to [2, 1, 3]. Additionally, a, B, and y indicate the angles around the first (i), second (j), and third (k) axis rotation sequence, respectively. Further, tan is the trigonometric function tangent, sin is the trigonometric function sine, ¿ is the epsilon indicating the Levi-Civita symbol, and n is the total number of dimensions, which is going to be in most cases (if not all) equal to 3. A' is the transpose of the reference rotation matrix A, and B is the rotation matrix of any rigid body or system that we are interested in computing its Euler angles relative to A. Further, A may be the rotation matrix of a global (fixed or moving) reference frame, in case the interest is to check the global orientation of B, or A could be the rotation matrix of a local (fixed or moving) reference frame of another rigid body, to which we want to express the B, in case the interest is to check the orientation of B relative to A. Alternatively, in other example embodiments, A and B may be both the rotation matrices of the same rigid body but at different time instants, in case the interest is to check the relative change in the orientation of B at time T relative to time T−1 or time T+1. Thus, in this example, A may be the rotation matrix of the rigid body at time T−1 or time T+1. Further, R is the rotation matrix expressing the coordinate system of the rigid body B in the reference system A. In other example embodiments, equations (9) to (11) above may be universal equations, and valid statements that allow the calculations of Euler angles in all 3D axis rotation sequences in a very systematic and clear way.

FIG. 1 illustrates an example pseudo-code that may be implemented, according to certain example embodiments. However, in other example embodiments, there may be additional example pseudo-codes that may be implemented as shown in FIGS. 2-12. In certain example embodiments, the example pseudo-codes illustrated in FIGS. 2-12 represent different embodiments of equations (9) to (11) shown above. According to certain example embodiments, by implementing the example pseudo-code in FIG. 1, it may be possible to solve high-dimensionality problems when calculating 3D Euler angles from rotation matrices. Every 3D rotation convention (i.e., XYZ, XZY, YXZ, YZX, ZXY, ZYX) may correspond to a set of three equations that may solve for the Euler angles. In general, the convention may be written in letters 'XYZ', or in numbers '123'. These two annotations may be used interchangeably, and these may be the six different conventions in both styles of annotation: XYZ, XZY, YXZ, YZX, ZXY, ZYX, or 123, 132, 213, 231, 312, 321.

With reference to the pseudo-code illustrated in FIG. 1, a function may be created, under the name "euler" or any other name. The function may take as inputs, the rotation sequence of interest 'ijk' and the rotation matrix of interest. The function's output are the three Euler angles, and the lines starting with a percentage sign are non-executable lines. In particular, the lines starting with a percentage sign are only a description of the input variables and not part of executable code. As shown in FIG. 1, line number 1 converts the rotation sequence from a string to an array, as follows: 'XYZ to [1,2,3]; 'XZY' to [1,3,2]; 'YXZ' to [2,1,3]; 'YZX' to [2,3,1]; 'ZXY' to [3,1,2]; and 'ZYX' to [3,2,1]. Line number 2 calculates the second Euler angle, which may be the Euler angle around the second axis in the rotation sequence. According to certain example embodiments, the calculation may be performed by computing the inverse sine of [levi-civita of (k,i,j) multiplied by the matrix element in row (i) and column (k)]. Line number 3 calculates the first Euler angle, which may be the Euler angle around the first axis in the rotation sequence. In certain example embodiments, the calculation may be performed by computing the inverse tangent of [levi-civita of (k,j,i) multiplied by the matrix element in row (j) and column (k), divided by the matrix element in row (k) and column (k)]. Further, line number 4 calculates the third Euler angle, which may be the Euler angle around the third axis in the rotation sequence. It does the calculation, by computing the inverse tangent of [levi-civita of (j,i,k) multiplied by the matrix element in row (i) and column (j), divided by the matrix element in row (i) and column (i)].

According to certain example embodiments, the new set of equations (9) to (11) may solve the high-dimensionality problem (e.g., 3 equations for each of the 6 possible 3D conventions) when solving for 3D Euler angles, especially when an iteration between conventions is needed, for instance to avoid the problem of gimbal lock. Thus, the algorithm of certain example embodiments may reduce the dimensions (equations) from 18 to 3, irrespective of the chosen convention. Additionally, the new set of equations (9) to (11) may be considered as universal equations that may describe the relationship between rotation matrices and Euler angles for any convention.

According to certain example embodiments, with the data/information obtained from implementing the equations/ expressions above, it may be possible to describe all rotations using three numbers such as, for example, $\alpha$, $\beta$, and $\gamma$ as the succession of three rotational movements around three orthonormal axes. Euler angles may be intuitive because they may be able to describe all rotations using these three numbers. The ease of storing and interpreting Euler angles over quaternions and rotation matrices favor them in visual attitude/orientation feedback in navigation (e.g., aircraft attitude indicator, and/or spacecraft flight director attitude indicators), robotics (e.g., inertial measurement units), and human movement analysis (e.g., motion capture systems).

For instance, in certain example embodiments, in human movement analysis, modeling and simulation, the 3D joint (Euler) angles may be very valuable parameters. For instance, the shoulder joint can be seen as a 'ball and socket joint', which is a three-gimbal mechanism. The largest rotation at the shoulder joint in a certain movement could be in the frontal anatomical plane, around the x-axis (postero-anterior axis), or in the sagittal anatomical plane around the y-axis (medio-lateral axis). Therefore, depending on the movement and the largest rotation detected, the Euler angles convention may be changed to avoid potential gimbal lock. For instance, the Euler angles convention may be changed in a way that the axis around which the largest rotation is happening should be first in the convention, followed by the second largest rotation, and finally the smallest rotation between the three (e.g., XYZ, or YXZ). The algorithm of certain example embodiments described herein may then be able to solve for the Euler angles using the three newly established equations (1 equation for each angle) without the need to change algorithm or change equations when the convention is changed.

FIG. 13 illustrates a flow diagram of a method, according to certain embodiments. In certain embodiments, the flow diagram of FIG. 13 may be performed by a computing device, for instance, a computing device for assisting people with VI in an environment (e.g., indoor environment), similar to apparatus 10 illustrated in FIG. 14.

According to one embodiment, the method of FIG. 13 may include, at 1300, determining a three-dimensional (3D) coordinate system of a rigid body D at a time T. The method may also include, at 1305, determining a 3D coordinate system of a rigid body E at time T. The method may further include, at 1310, determining a relative orientation at time T of the rigid body E in the 3D coordinate system of the rigid body D. In addition, the method may include, at 1315, calculating a final relative orientation of the rigid body E in the 3D coordinate system of the rigid body D by implementing a single set of Euler angle equations irrespective of a rotation sequence or a convention chosen. According to certain example embodiments, the determination of the 3D coordinate systems of the rigid body D and the rigid body E are represented each in the form of 3×3 rotation matrices.

According to certain example embodiments, the Euler angles are determined at anytime and anywhere between a rigid body coordinate system and another rigid body coordinate system, between the rigid body coordinate system and a fixed or moving global reference frame, or between the rigid body coordinate system at time S, and a rigid body coordinate system of a same rigid body at any other time P. According to some example embodiments, the method may further include determining a change in the orientation between the rigid body D and the rigid body E. According to other example embodiments, the determination of the change in the orientation between the rigid body D and the rigid body E may be made with reference to a reference frame. In certain example embodiments, the reference frame may include another rigid body, a fixed frame, or a moving body.

Figure 14:
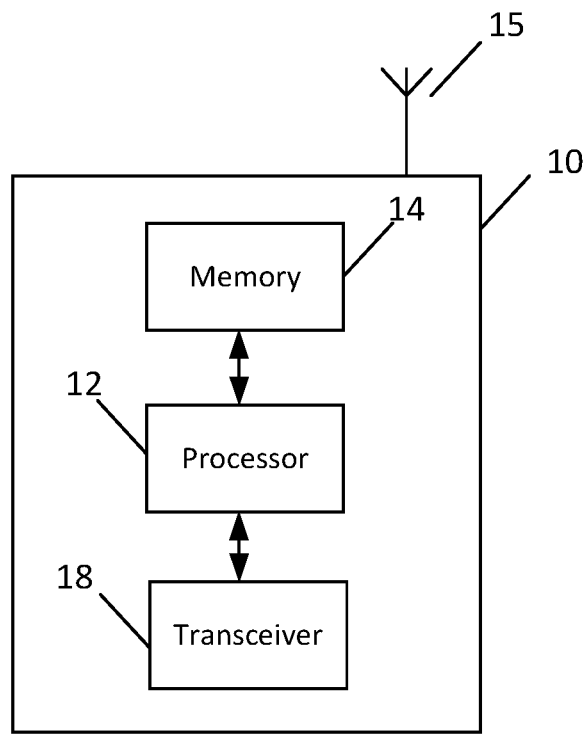
FIG. 14 illustrates an apparatus, according to certain embodiments.

FIG. 14 illustrates an apparatus according to certain embodiments. According to certain embodiments, apparatus 10 may be a computing device including, for example, a single-board computer (e.g., PCB). As described herein, a computing device may alternatively be referred to as, for example, a computer, hardware device, mobile device, or the like.

In some example embodiments, apparatus 10 may include one or more processors, one or more computer-readable storage medium (for example, memory, storage, or the like), and/or a user interface. It should be noted that one of ordinary skill in the art would understand that apparatus 10 may include components or features not shown in FIG. 14.

As illustrated in the example of FIG. 14, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 14, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-13.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-13. In other example embodiments, any of the methods illustrated in FIGS. 1-13 may be performed via implementation of machine learning (ML) or neural network models. For instance, in certain example embodiments, the ML may be trained to forecast/predict movement and/or orientation of a rigid body in space. In a further example, the methods illustrated in FIGS. 1-13 may be used with virtual reality technologies, to estimate the user's head orientation while playing a video game, or navigating a virtual environment, or navigating an avatar in the metaverse space, to determine how the video game character, object in the virtual environment or avatar is oriented in a three-dimensional or multi-dimensional space. In a further example, methods illustrated in FIGS. 1-13 may be used for 3D skeletal character animations in a virtual space. In another example, methods illustrated in FIGS. 1-13 may be combined with other conventional models, including, for example, probabilistic models for applications related to human faces in a physical or virtual space.

In some embodiments, apparatus 10 may also include or be coupled to one or more antennas 15 for receiving a signal and for transmitting from apparatus 10. Apparatus 10 may further include a transceiver 18 configured to transmit and receive information. For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with other hardware elements described herein via a wireless or wired communications link.

According to certain example embodiments, processor 12 and memory 14 may be included in or may form a part of processing circuitry or control circuitry. In addition, in some embodiments, transceiver 18 may be included in or may form a part of transceiving circuitry. As discussed above, according to certain example embodiments, apparatus 10 may be a controller for example. According to certain embodiments, apparatus 10 may be controlled by memory 14 and processor 12 to perform the functions associated with example embodiments described herein.

For instance, in one embodiment, apparatus 10 may be controlled by memory 14 and processor 12 to determine a three-dimensional (3D) coordinate system of a rigid body D at a time T. The apparatus 10 may also be controlled by memory 14 and processor 12 to determine a 3D coordinate system of a rigid body E at time T. The apparatus 10 may further be controlled by memory 14 and processor 12 to determine a relative orientation at time T of the rigid body E in the 3D coordinate system of the rigid body D. In addition, the apparatus 10 may be controlled by memory 14 and processor 12 to calculate a final relative orientation of the rigid body E in the 3D coordinate system of the rigid body D by implementing a single set of Euler angle equations irrespective of a rotation sequence or a convention chosen. According to certain example embodiments, the determination of the 3D coordinate systems of the rigid body D and the rigid body E may be represented each in the form of 3×3 rotation matrices.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for determining a three-dimensional (3D) coordinate system of a rigid body D at a time T. The apparatus may also include means for determining a 3D coordinate system of a rigid body E at time T. The apparatus may further include means for determining a relative orientation at time T of the rigid body E in the 3D coordinate system of the rigid body D. In addition, the apparatus may include means for calculating a final relative orientation of the rigid body E in the 3D coordinate system of the rigid body D by implementing a single set of Euler angle equations irrespective of a rotation sequence or a convention chosen. According to certain example embodiments, the determination of the 3D coordinate systems of the rigid body D and the rigid body E may be represented each in the form of 3×3 rotation matrices.

Certain embodiments described herein provide several technical improvements, enhancements, and/or advantages. The current technologies use a set of three equations for each Euler convention, and change algorithms or change equations when there is a need to solve for Euler angles using a different convention. In view of such drawbacks, certain example embodiments may provide a unique algorithm and new set of equations that may be used to solve for any convention. Thus, according to certain example embodiments, the algorithm and new set of equations are computationally more efficient and intuitive than current technologies. This may therefore have a significant impact on teaching Euler angles in educational environments, and applying them in research and real-world tasks.

In other example embodiments, it may be possible to cover the equations that solve for the relationship between quaternions and rotation matrices (48 equations), quaternions and Euler angles (48 equations), and rotation matrices and 2-D Euler angles (18 equations). These, along with the aforementioned advantages, may enhance the understanding and application of these relationships when describing and analyzing 3D attitude of a body in space.

According to further example embodiments, it may be possible to compute the orientation change from known position coordinates or a rotation matrix. Certain example embodiments may also not be limited to optical apparatuses, and may have a wide variety of applications on any system and any rigid body in 3D space. For instance, certain example embodiments may determine the 3D orientation of a rigid body in space. Additionally, certain example embodiments may solve the problem of multiple equations due to multiple conventions of rotations, and certain example embodiments may be used to optimize the computation of Euler angles in the transformation process.

In other example embodiments, it may be possible to simplify and optimize Euler angle calculation irrespective of the rotational convention used. Further, it may be possible to provide three equations that may serve as universal equations to any rotation sequence.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

I claim:

1. A machine learning method for navigating an object in a three-dimensional (3D) virtual space with an input device in communication with a computing device, the method comprising:
   determining with the computing device, a 3D coordinate system of a first virtual object D in the 3D virtual space at a time T;
   determining with the computing device, a 3D coordinate system of a second virtual object E in the 3D virtual space at time T;

determining with the computing device, a relative orientation at time T of the second virtual object E in the 3D virtual space in the 3D coordinate system of the first virtual object D;

calculating with the computing device, a final relative orientation of the second virtual object E in the 3D virtual space in the 3D coordinate system of the first virtual object D by implementing a single set of Euler angle equations irrespective of a rotation sequence or a convention chosen, wherein the determination of the 3D coordinate system of the first virtual object D and the second virtual object E are represented each in the form of 3×3 rotation matrices; and outputting the final relative orientation of the second virtual object E to a user interface.

2. The machine learning method for navigating the object in the 3D virtual space according to claim 1, wherein the Euler angles are determined at anytime and anywhere between a virtual object coordinate system and another virtual object coordinate system, between the virtual object coordinate system and a fixed or moving global reference frame, or between the virtual object coordinate system at time S, and a virtual object coordinate system of a same virtual object at any other time P.

3. The machine learning method for navigating the object in the 3D virtual space according to claim 1, further comprising:

determining a change in the orientation between the first virtual object D and the second virtual object E, wherein the determination of the change in the orientation between the first virtual object D and the second virtual object E is made with reference to a reference frame.

4. The machine learning method for navigating the object in the 3D virtual space according to claim 3, wherein the reference frame comprises:

another virtual object, a fixed frame, or a moving body.

5. An apparatus for executing machine learning to navigate an object in a three-dimensional (3D) virtual space with an input device in communication with a computing device, comprising:

at least one processor; and at least one memory including computer program code, wherein the at least one memory and the computer program code are configured to, with the at least one processor, cause a controller at least to:

determine a 3D coordinate system of a first virtual object D in the 3D virtual space at a time T;

determine a 3D coordinate system of a second virtual object E in the 3D virtual space at time T;

determine a relative orientation at time T of the second virtual object E in the 3D virtual space in the 3D coordinate system of the first virtual object D; and calculate a final relative orientation of the second virtual object E in the 3D virtual space in the 3D coordinate system of the first virtual object D by implementing a single set of Euler angle equations irrespective of a rotation sequence or a convention chosen, wherein the determination of the 3D coordinate system of the first virtual object D and the second virtual object E are represented each in the form of 3×3 rotation matrices; and output the final relative orientation of the second virtual object E to a user interface.

6. The apparatus for executing machine learning to navigate the object in the 3D virtual space according to claim 5, wherein the Euler angles are determined at anytime and anywhere between a virtual object coordinate system and another virtual object coordinate system, between the virtual object coordinate system and a fixed or moving global reference frame, or between the virtual object coordinate system at time S, and a virtual object coordinate system of a same virtual object at any other time P.

7. The apparatus for executing machine learning to navigate the object in the 3D virtual space according to claim 5, wherein the at least one memory and the computer program code are further configured to, with the at least one processor, cause the apparatus at least to:

determine a change in the orientation between the first virtual object D and the second virtual object E, wherein the determination of the change in the orientation between the first virtual object D and the second virtual object E is made with reference to a reference frame.

8. The apparatus for executing machine learning to navigate the object in the 3D virtual space according to claim 7, wherein the reference frame comprises:

another virtual object, a fixed frame, or a moving body.

9. A non-transitory computer readable medium for executing machine learning to navigate an object in a three-dimensional (3D) virtual space with an input device in communication with a computing device, the non-transitory computer readable medium encoded with instructions that, when executed in hardware, performs a process, the process comprising:

determining a 3D coordinate system of a first virtual object D in the 3D virtual space at a time T;

determining a 3D coordinate system of a second virtual object E in the 3D virtual space at time T;

determining a relative orientation at time T of the second virtual object E in the 3D virtual space in the 3D coordinate system of the first virtual D; and calculating a final relative orientation of the second virtual object E in the 3D virtual space in the 3D coordinate system of the first virtual object D by implementing a single set of Euler angle equations irrespective of a rotation sequence or a convention chosen, wherein the determination of the 3D coordinate system of the first virtual object D and the second virtual object E are represented each in the form of 3×3 rotation matrices; and outputting the final relative orientation of the second virtual object E to a user interface.

10. The non-transitory computer readable medium according to claim 9, wherein the Euler angles are determined at anytime and anywhere between a virtual object coordinate system and another virtual object coordinate system, between the virtual object coordinate system and a fixed or moving global reference frame, or between the virtual object coordinate system at time S, and a virtual object coordinate system of a same virtual object at any other time P.

11. The non-transitory computer readable medium according to claim 9, wherein the process further comprises:

determining a change in the orientation between the first virtual object D and the second virtual object E, wherein the determination of the change in the orientation between the first virtual object D and the second virtual object E is made with reference to a reference frame.

12. The non-transitory computer readable medium according to claim 11, wherein the reference frame comprises:

another virtual object,
a fixed frame, or
a moving body.

* * * * *